(12) United States Patent
Nainar et al.

(10) Patent No.: US 10,951,578 B1
(45) Date of Patent: Mar. 16, 2021

(54) STATELESS POLICY AND SERVICE CHAINING IN NEUTRAL HOST NETWORK

(71) Applicant: Cisco Technology, Inc., San Jose, CA (US)

(72) Inventors: Nagendra Kumar Nainar, Morrisville, NC (US); Carlos M. Pignataro, Cary, NC (US); Rajiv Asati, Morrisville, NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/743,073

(22) Filed: Jan. 15, 2020

(51) Int. Cl.
*H04L 12/741* (2013.01)
*H04L 29/12* (2006.01)
*H04L 29/06* (2006.01)
*H04L 12/70* (2013.01)

(52) U.S. Cl.
CPC .......... *H04L 61/2007* (2013.01); *H04L 45/74* (2013.01); *H04L 69/03* (2013.01); *H04L 2012/5686* (2013.01)

(58) Field of Classification Search
None
See application file for complete search history.

(56) References Cited

U.S. PATENT DOCUMENTS

| | | | | |
|---|---|---|---|---|
| 2004/0088544 | A1* | 5/2004 | Tariq | H04L 63/0435 713/162 |
| 2006/0176847 | A1* | 8/2006 | Chen | H04L 29/12009 370/328 |
| 2014/0043964 | A1* | 2/2014 | Gabriel | H04L 41/5022 370/229 |
| 2016/0219414 | A1* | 7/2016 | Purohit | H04W 4/06 |
| 2017/0374059 | A1* | 12/2017 | Ahmavaara | H04L 45/74 |

OTHER PUBLICATIONS

F. Clad et al., "Segment Routing for Service Chaining" draft-xuclad-spring-sr-service-chaining-01, Internet Engineering, Task Force (IETF), Mar. 5, 2018, 36 pages.
Dr. G. Wolfner, "MulteFire End-to-End Architecture and Neutral Host", MulteFire, 21 pages; retrieved from Internet Nov. 1, 2019.
CBRS Alliance, "CBRS Network Services Stage 2 and 3 Specification", CBRSA-TS-1002, V2.0.0, Feb. 4, 2019, 52 pages.
CBRS Alliance, "CBRS Network Service Technical Specifications", CBRSA-TS-1002, V1.0.0, Feb. 1, 2018, 26 pages.

* cited by examiner

*Primary Examiner* — Cai Y Chen
(74) *Attorney, Agent, or Firm* — Edell, Shapiro & Finnan, LLC

(57) ABSTRACT

Presented herein are techniques that provide for a way to associate a policy, or signal the policy for a user equipment (UE), directly from the UE traffic, inband or, in other words, within the data plane. The policies are effectively embedded in the address of the UE traffic. When the Neutral Host Network (NHN) receives the UE traffic, the policy can be determined directly from the address associated with the UE traffic. This provides for a unique way of integrating a service chain identifier in the Internet Protocol address of the UE to identify the services/policies to be applied to UE traffic in a stateless manner.

20 Claims, 9 Drawing Sheets

800

810 — OBTAINING A PACKET ORIGINATING FROM, OR SENT TO, A USER EQUIPMENT VIA A NEUTRAL HOST NETWORK AND DESTINED TO, OR ORIGINATING FROM, A PARTICULAR PARTICIPATING SERVICE PROVIDER, THE PACKET HAVING AN INTERNET PROTOCOL (IP) ADDRESS ASSIGNED TO THE USER EQUIPMENT, THE IP ADDRESS BEING BASED ON A CONCATENATION OF A PREFIX ASSOCIATED WITH THE PARTICULAR PARTICIPATING SERVICE PROVIDER, A POLICY IDENTIFIER THAT IDENTIFIES A POLICY DETERMINED FOR THE USER EQUIPMENT, AND A USER EQUIPMENT IDENTIFIER

820 — OBTAINING THE POLICY IDENTIFIER FROM THE IP ADDRESS OF THE PACKET

830 — DETERMINING, BASED ON THE POLICY IDENTIFIER, A PARTICULAR POLICY AMONG A PLURALITY OF POLICIES, EACH POLICY REPRESENTING ONE OR MORE SERVICES TO BE APPLIED TO THE PACKET FROM THE USER EQUIPMENT

840 — DIRECTING THE PACKET TO ONE OR MORE SERVICES ACCORDING TO THE PARTICULAR POLICY

FIG.8

STATELESS POLICY AND SERVICE CHAINING IN NEUTRAL HOST NETWORK

TECHNICAL FIELD

The present disclosure relates to Neutral Host Network (NHNs).

BACKGROUND

With the evolution of neutral hosting, it is common that an NHN provides mobility service for multiple participating service providers (PSPs) or enterprise services, also known as managed Private Long Term Evolution (LTE) services. The NHN provides a backhaul connection from the radio access network to different PSPs or private networks.

There are different policies that indicate certain processes/functions of different types to be applied for traffic from a User Equipment (UE) connecting to an NHN. In order to do that, policies are enforced and maintained on a User Plane Function (UPF) of a PSP. For each UE, the PSP UPF would need to maintain at least one policy. If the UE is associated with multiple network slices, then the number of policies/state entries that need to be stored on the PSP UPF increases, causing scaling issues.

BRIEF DESCRIPTION OF THE DRAWINGS

FIG. 8 is a flow chart depicting a method for policy application to user equipment traffic, according to an example embodiment.

DESCRIPTION OF EXAMPLE EMBODIMENTS

Overview

Figure 1:
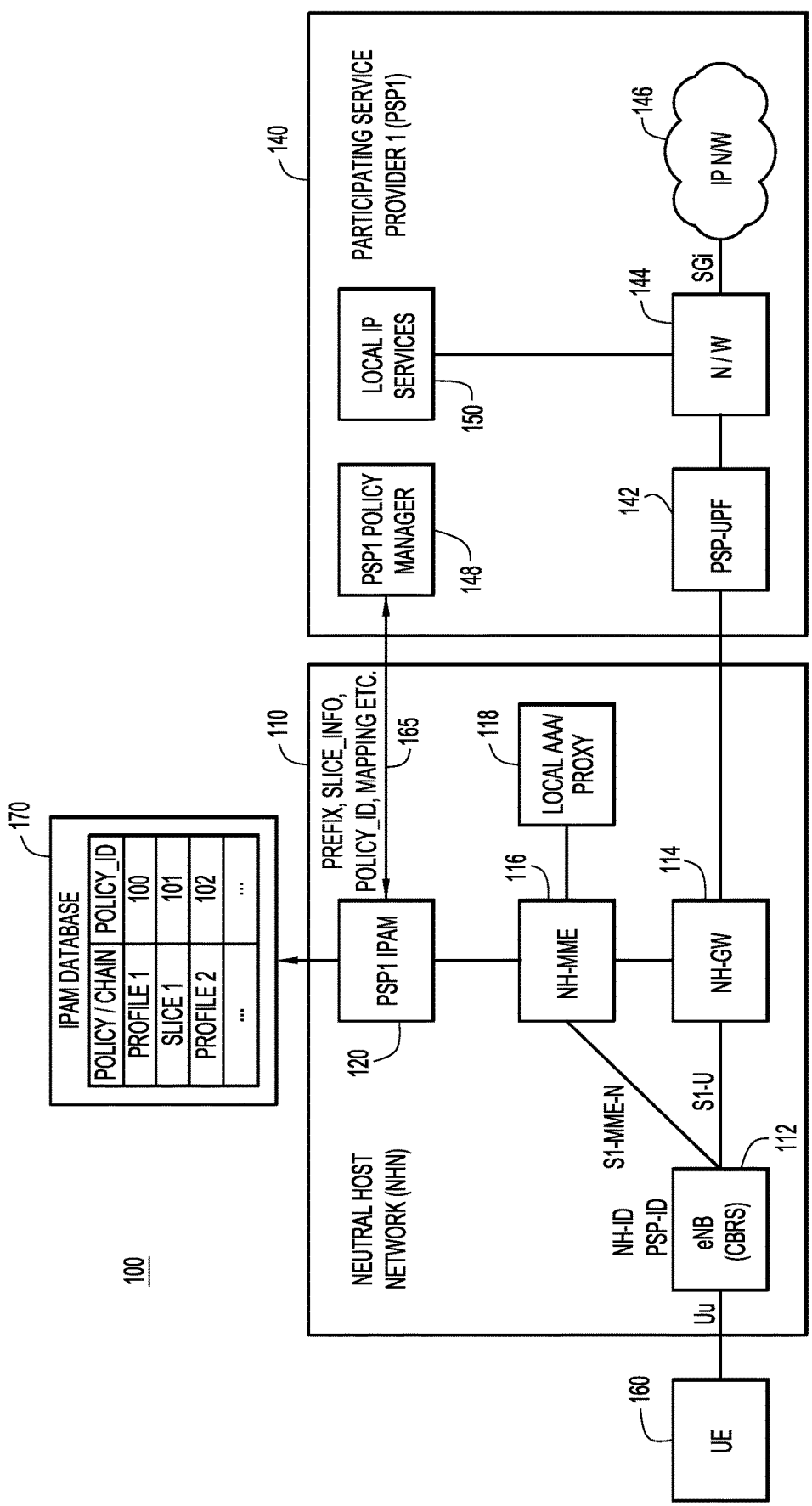
FIG. 1 is a block diagram of a system configured to maintain user plane function policies in neutral host network environments in a stateless manner, according to an example embodiment.

In one embodiment, a method is provided for assigning an address to a user equipment in such a way that policy information is embedded in the address. The method includes obtaining an address request for a user equipment seeking services of a particular participating service provider through a neutral host network, the address request including an indication of a profile of the user equipment or a slice, if requested, by the user equipment. The method determines based on the profile or slice indicated in the address request, a policy representing one or more services to be applied to traffic associated with the user equipment. The method generates an Internet Protocol (IP) address for the user equipment based on a concatenation of a prefix associated with the particular participating service provider, a policy identifier that identifies the policy determined for the user equipment, and a user equipment identifier. The method includes providing an address response to be sent to the user equipment, the address response including the IP address assigned to the user equipment.

In accordance with another embodiment, a method is provided for determining an appropriate policy to be enforced on traffic associated with user equipment. The method includes obtaining a packet originating from, or sent to, a user equipment via a neutral host network and destined to, or originating from, a particular participating service provider, the packet having an Internet Protocol (IP) address assigned to the user equipment. The IP address is based on a concatenation of a prefix associated with the particular participating service provider, a policy identifier that identifies a policy determined for the user equipment, and a user equipment identifier. The method includes obtaining the policy identifier from the IP address of the packet; determining, based on the policy identifier, a particular policy among a plurality of policies, each policy representing one or more services to be applied to the packet from the user equipment; and directing the packet to one or more services according to the particular policy.

EXAMPLE EMBODIMENTS

Current NHN techniques allow a UE to connect and forward any traffic over a selected Participating Service Provider (PSP) User Plane Function (UPF). Based on the service/network-slice or local policy, the PSP may need to apply set of services on any traffic from the UE. Policies are created on the PSP UPF (or Enhanced Packet Data Gateway (ePDG)) to classify the traffic from and/or to the UE and apply the relevant service chain(s) to the traffic. This results in creating numerous policies and associated state entries on the UPF. It is also common that a User Equipment (UE) may use several network slices, which increases the amount of state entries to be stored on the UPF.

Presented herein are techniques that provide for a way to associate the policy, or signal the policy for the UE, directly from the UE traffic, inband or, in other words, within the data plane. The policies are effectively embedded in the address of the UE traffic. When the Neutral Host Network (NHN) receives the UE traffic, the policy can be determined directly from the address associated with the UE traffic. Thus, a unique way of integrating a service chain identifier in the IP address of the UE is provided to identify the services/policies to be applied to UE traffic in a stateless manner. This has the desirable benefit of reducing the number of state entries that need to be stored to serve traffic from numerous UEs. This solution is much more scalable than solutions heretofore known.

Reference is first made to FIG. 1. FIG. 1 shows a block diagram of a system 100 that includes an NHN 110 that is in communication with a PSP, enterprise network or private LTE network, denoted PSP1 shown at 140. There may be a plurality of PSPs in communication with the NHN 110 as will become apparent from the following description, but for simplicity, in FIG. 1, only a single PSP, PSP1 140, is shown.

The NHN 110 includes an eNodeB (eNB) or gNB 112, a Neutral Host Gateway (NH-GW) 114, a Neutral Host Mobility Management Entity (NH-MME) 116, a local Authentication, Authorization and Accounting (AAA)/proxy function 118 and a PSP Internet Protocol (IP) Address Management (IPAM) entity, denoted PSP1 IPAM 120. The eNB 112 may be configured to support Citizen Broadband Radio Service (CBRS) operation in a 150 MHz wide broadcast band of the 3.5 GHz band (3550 MHz to 3700 MHz) in the United States.

The eNB 112 may communicate with the NH-GW 114 via the S1-U interface as defined in the LTE standard specifications. Similarly, the eNB 112 may communicate with the NH-MME 116 via the S1-MME-N interface. The PSP1 IPAM 120 assigns IP addresses to a UE as a UE registers for service with a PSP, e.g., PSP1 140. The NHN 110 and the PSP1 140 may be connected via an IP network.

The PSP1 140 includes PSP-UPF 142, a local PSP network 144 that has connectivity to an external IP network 146 and PSP1 policy manager 148. The PSP-UPF 142 performs user plane functions on UE traffic forwarded by the NH-GW 114 in the NHN 110. Examples of such user plane functions include firewall, deep packet inspection (DPI), network address translation (NAT), optimizations. The PSP1 140 further includes local IP services entity 150 that provides services such as Doman Name System (DNS) services, Network Time Protocol (NTP) services, Authentication, Authorization and Accounting (AAA), firewall, network address translation, etc.

The connectivity between the NH-GW 114 and the PSP-UPF 142 is a data plane and it can leverage the N9 interface, whereas in case of an ePDG, this can be S2B interface. The General Packet Radio Service (GPRS) Tunneling Protocol (GTP) tunnel terminates on the NH-GW 114 and the PSP-UPF 142.

A UE 160 is shown in FIG. 1 to be granted access to PSP1 140 via the NHN 110. The UE 160 may be seeking non-trusted 3GPP or non-3GPP access via NHN 110. While only a single UE 160 is shown in FIG. 1, this is for simplicity and explanatory purposes only.

In NHN 110, the NH-MME 116 is responsible for IP address allocation for UEs. In accordance with the techniques presented herein, the ability to identify the PSP to which the UE is registering is leveraged and a PSP specific IPAM function, e.g., PSP1 IPAM 120 in the example of FIG. 1, assigns a unique and special-semantic IP address to each UE. The special semantic is a concatenation of Prefix+Policy_ID+UE_ID. The IPAM 120 obtains indications of supported policies for (a set of) UEs along with their mappings to profile, slice etc. The IPAM 120 uses this information to formulate a particular address for a UE. This concatenated address is referred to herein as Policy_ID Address.

More specifically, the format of the UE IP address is:

Prefix. The Prefix is used to identify the PSP to which the UE belongs. The prefix may also be specific to a UE. The PSP-UPF 142 also uses this Prefix to detect that the address is a Policy_ID Address, that is, an IP address that signals the policy to be applied to the traffic that carries that IP address.

UE_ID. This is a unique identifier (ID) that is assigned for each UE per NHN site. This can be used by the PSP to identify not only a particular UE, but also a particular NHN site. This allows the PSP to also enforce NHN specific policies, as needed.

Policy_ID. This is unique to the PSP and each Policy_ID identifies the set of (one or more) policies or identifies a particular service chain to be applied to UE traffic.

As shown in FIG. 1, the PSP1 IPAM 120 is hosted in the NHN 110 on a per PSP basis and this function is controlled by the respective PSP, PSP1 in the example of FIG. 1. If other PSPs, such as PSP2, PSP3, and so on, are associated with NHN 110, then there would be a PSP2 IPAM, a PSP3 IPAM, and so on, in the NHN 110, which performs operations described herein for PSP2, PSP3, etc. It should be understood that the location of the PSP IPAM shown in FIG. 1 is not meant to be limiting. It is possible that it may be hosted elsewhere, such as inside the PSP 140 itself. As shown at 165, the PSP1 IPAM 120 synchronizes with the PSP1 policy manager 148 to obtain the Prefix, slice/policy information (Slice_Info), Policy_ID and mapping for each such policies/slices that are available in the PSP 140 for UE traffic. This mapping information is maintained in a local database in PSP IPAM 120.

FIG. 1 shows the local database 170 that the PSP1 IPAM 120 maintains. In the example of FIG. 1, the local database includes a mapping between three different policies and their associated Policy_ID. Profile 1 (service chain 1) has a Policy_ID 100, which has associated with it a policy or service chain functions to be applied to UE traffic having an IP address that includes that Policy_ID 101. Similarly, Slice 1 is associated with Policy_ID 101 and Profile 2 is associated with Policy_ID 102, and so on.

The PSP1 IPAM 120 does not blindly allocate an IP address for a UE from a pool of IP addresses. Instead, PSP1 IPAM 120 concatenates different details (Prefix, UE_ID and Policy_ID) to create an IP address for the UE. Since this concatenated IP address indicates or signals/embeds the Policy_ID, the IP address thus indicates/identifies the policy to be applied to traffic carrying that IP address, for the UE. If Segment Routing version (SRv6) encapsulation is used, then the special semantic address can be carried as a source address (or destination address) to be used by the PSP-UPF 142 to identify the policies.

Figure 2:
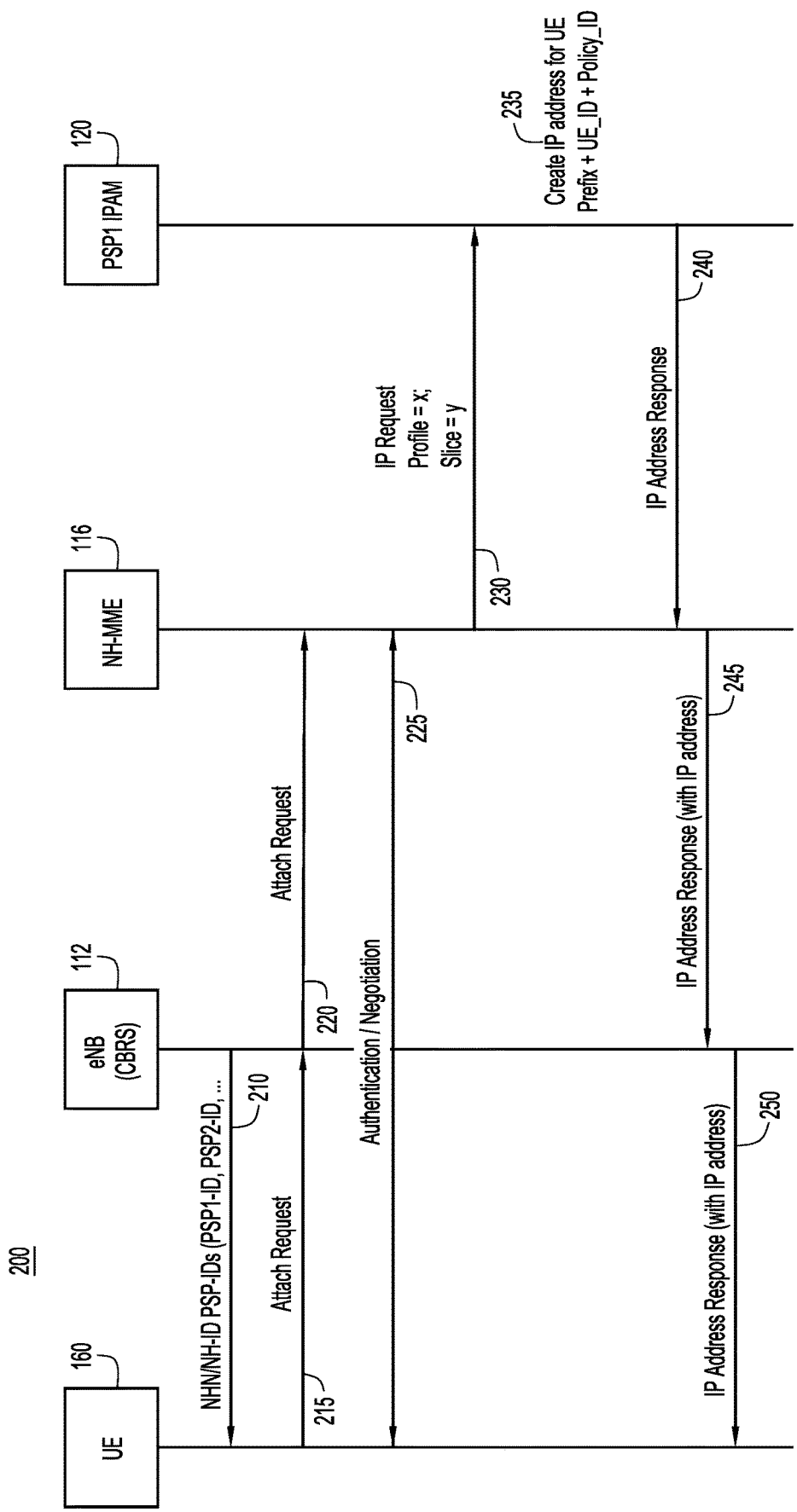
FIG. 2 is a message sequence diagram depicting a process for generating and providing an Internet Protocol (IP) address for user equipment, according to an example embodiment.

Reference is now made to FIG. 2, with continued reference to FIG. 1. FIG. 2 shows a message sequence flow 200 for registering a UE with a PSP and allocating an address for the UE. The message sequence flow 200 involves interactions among the UE 160, eNB 112, NH-MME 116, and PSP1 IPAM 120.

When a UE registers with a PSP ID associated with a particular PSP, the NH-MME 116 will detect to which provider the UE is trying to register, and forwards the request to a particular PSP IPAM. The particular PSP IPAM identifies the policy that needs to be assigned, and it obtains the unique value for that policy. The three details: IPv6 Prefix, Policy_ID and UE_ID are concatenated to form a unique IPv6 IP address to be used as an IP address for the UE. For example, a unique 128-bit IPv6 address (comprising 64 bits for Prefix, 16 bits for Policy_ID, 48 bits for UE_ID) may be formulated. In another example, a unique 64-bit address is formulated (52 bits for Prefix, 8 bits for Policy_ID, and 4 bits for UE_ID).

As shown at 210, the eNB 112 in NHN 110 advertises all the PSPs (PSP-IDs) the NHN supports and the NH-ID for NHN 110. For example, a first PSP would have a first PSP-ID, PSP1-ID, a second PSP would have a second PSP-ID, PSP2-ID and so on. In this manner, by receiving from the eNB 112 the advertisement of PSPs that the NHN 110 supports, the UE 160 will become aware of the supported PSPs of the NHN 110. At 215, the UE 160 may send an Attach Request for a particular PSP, by including the PSP-ID of the desired PSP in the Attach Request message sent at 215. The Attach Request message also includes relevant details about the UE, such as an indication of a profile of the UE and a slice, if requested, by the UE. The eNB 112 forwards the Attach Request message to the NH-MME 116.

The NH-MME 116 and the UE 160 may enter into an authentication/negotiation exchange shown at 225, the details of which are known in the art, and not described herein. After the authentication is successfully completed, at 230, the NH-MME 116 sends to the PSP1 IPAM 120 an IP address request. The IP address request includes an indication of the Profile (=x) and the Slice (=y) obtained from the Attach Request for the UE 160. The profile and slice information contained in the IP address request sent at 230 are used to identify the appropriate policy ID. The UE is unaware of this, as the UE is just trying to register to a PSP and obtain an IP address.

When the PSP1 IPAM receives the IP address request, at 235, the PSP1 IPAM 120 creates an IP address for the UE 160. Specifically, the PSP1 IPAM 120 identifies the appropriate Policy_ID based on the profile or slice requested in the IP address request received from the NH-MME 116. The PSP1 IPAM 120 assigns a NHN locally unique UE_ID (NHN-ID:UE_ID), and concatenates the Prefix, UE_ID and Policy_ID together to form the assigned IP address for the UE 160. The PSP1 IPAM 120 stores an indication of the IP address that it created and assigned to UE 160.

At 240, the PSP1 IPAM 120 sends an IP address response to the NH-MME 116. At 254, the NH-MME 116 sends an Attach Response (including the assigned IP address for the UE 160) to the eNB 112. The eNB 112 transmits, at 250, an Attach Response (that includes the assigned IP address) to the UE 160.

When more than one slice is requested, the PSP1 IPAM 120 may assign different IP addresses with the same UE_ID but different Policy_ID, to the UE. That is, a UE may be assigned different IP addresses for different slices. The different IP addresses for a given UE will have the same UE_ID, but just a different Policy_ID. When the UE sends traffic related to a first slice, it will use a first IP address (having embedded therein a first Policy_ID), and when it sends traffic related to a second slice, it will use a second IP address (having embedded therein a second Policy_ID), etc.

Figure 3:
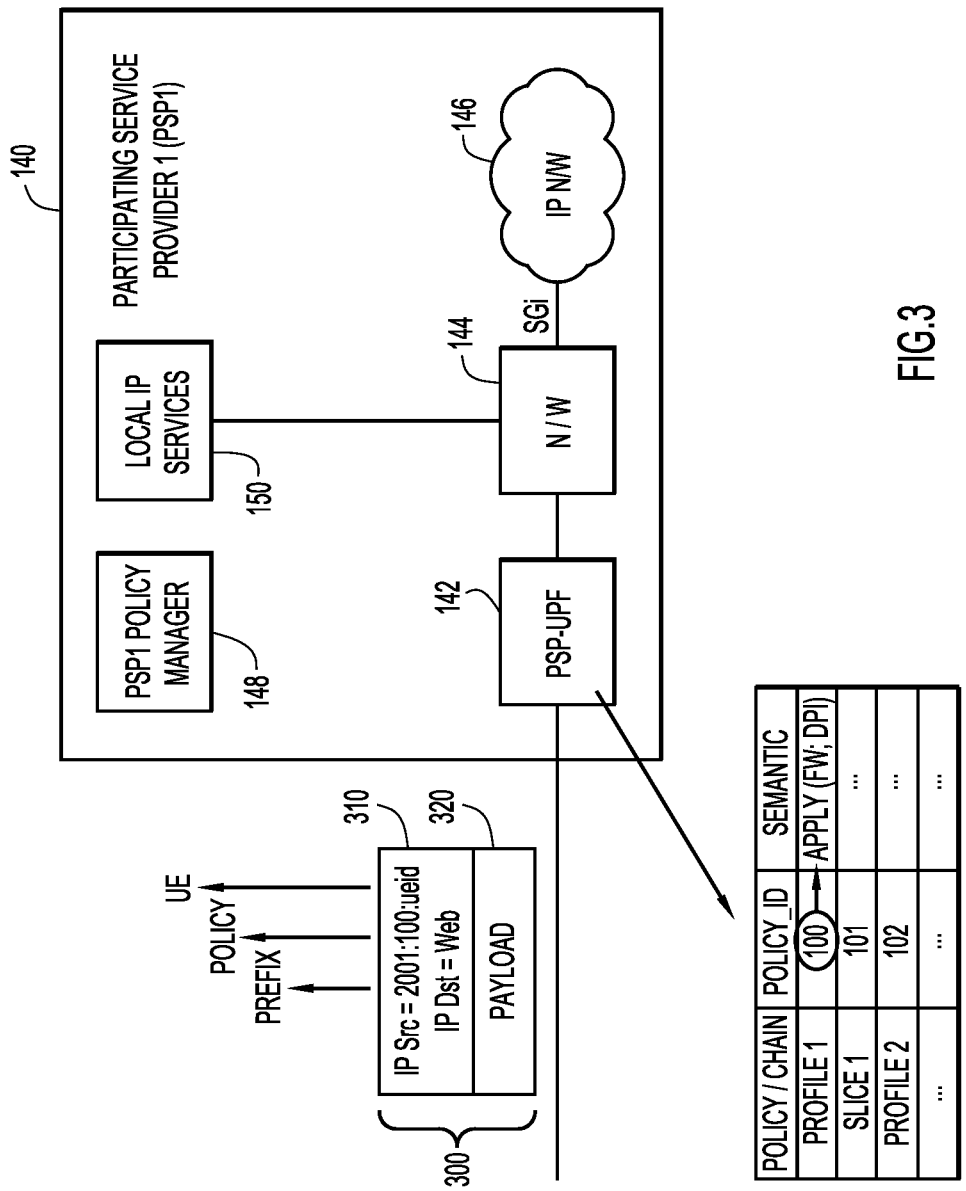
FIG. 3 is a diagram depicting enforcement of a policy by a user plane function on user equipment traffic, according to an example embodiment.

As depicted in FIGS. 1-3, the control plane session plays a role when the IPAM function is offloaded to the NHN, as depicted in FIGS. 1 and 2. In one possible deployment model, the IPAM can be managed by the NHN while keeping the IP prefix assignment based on the PSP-ID. When the UE registers using the relevant PSP-ID, the UE is assigned an IP prefix by the NHN IPAM for the particular PSP-ID and that IP prefix would have the policies identifier encoded as well. In another deployment model, the NHN can use the Gxc interface to a relevant PSP Policy and Charging Rules Function (PCRF) in the PSP to obtain the details on demand, derive the IP address (by concatenating the Prefix, UE_ID and Policy_ID) and assign the same to the UE.

Reference is now made to FIG. 3. FIG. 3 illustrates operations performed for enforcing/applying a policy on UE traffic that includes an IP address generated and assigned to a UE as described above in connection with FIG. 2.

The PSP-UPF 142 of PSP1 140 receives a packet 300 as part of UE traffic to or from a UE. The packet 300 includes a header 310 and Payload 320. In the case of uplink traffic from the UE, the header 310 includes the IP source (IP Src) address assigned to the UE and an IP destination (Dst) address. In the example of FIG. 3, the IP address is "2001:100:ueid", where 2001 is the Prefix, 100 is the Policy_ID and ueid is the UE_ID. It should be understood that in the case of downlink traffic from the network to the UE, the header 310 would include as the destination address, which is the IP address assigned to the UE.

The PSP-UPF 142 uses the Prefix of the IP address or the incoming interface to identify that the IP address is a Policy_ID address. The PSP-UPF 142 then fetches the Policy_ID from the IP address and applies the appropriate policy action for that Policy_ID. For example, as shown in FIG. 3, Policy_ID 100 is associated with Profile 1 and for this policy, firewall and deep packet inspection service functions are performed on the packet 300. In one example embodiment, the policy action may be to encapsulate the packet with a Segment Routing version 6 (SRv6) header and steer the packet over a network slice or over a set of service functions in a service chain, where one or more functions are applied to the packet 300. However, applying the policy actions to the packet need not require the use of SRv6.

The number of state entries on the PSP-UPF 142 is based on the number of policies and not on the number of UEs that the PSP1 140 serves. If there are 100 different policies/chains, the PSP-UPF 142 maintains 100 states, regardless of the number of UEs, because the Policy_ID is statelessly carried in the packet header of UE traffic.

Figure 4:
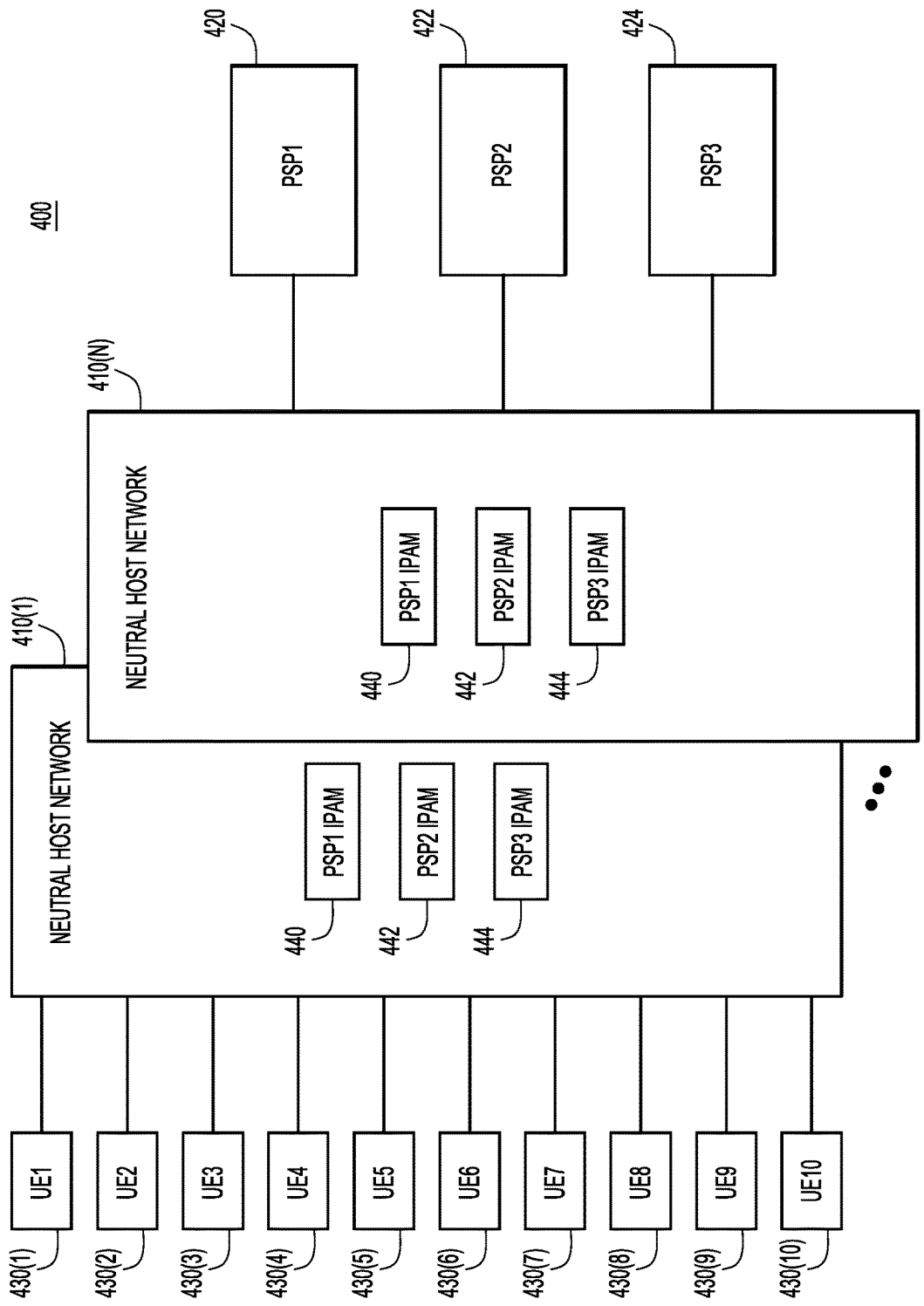
FIG. 4 is a diagram depicting how multiple participating service providers may serve traffic from different user equipment through one or more neutral host networks, according to an example embodiment.

Turning to FIG. 4, a diagram is shown that generalizes the concepts presented in FIGS. 1-3. FIG. 4 shows a system 400 that includes plurality of NHNs 410(1)-410(N), three PSPs 420, 422 and 424 and 10 UEs (UE1, . . . UE10) 430(1)-430(10).

A UE, which is a customer of a PSP, and uses NHNs as a transit network, allows a PSP operator to construct definitions of policies. In one form, the policies are independent of the NHNs and how many NHNs there are in a system. In another form, the policies can be coupled with the NHNs.

Below is a basic use case where 10 different UEs are connecting to 3 different PSPs via one or more NHNs.

In the example of FIG. 4, UE1, UE2, UE3, and UE4 connect to PSP1; UE5 and UE6 connect to PSP2; and UE7, UE8, UE9, and UE10 connect to PSP3. It is understood that it is possible that the UEs 430(1)-430(1) may connect to PSP1 420, PSP2 422 and PSP3 424 via any of the NHNs 410(1)-410(N). Moreover, there is an IPAM for each PSP in each of the NHNs that supports that PSP. For example, if NHN 410(1) supports PSP1 420, PSP2 422 and PSP3 424, then there is a PSP1 IPAM 440 for PSP1 420, a PSP2 IPAM 442 for PSP2 422 and a PSP3 IPAM 444 for PSP3 424 in NHN 410(1). If NHN 410(1) supports only PSP2, then NHN 410(1) would only have PSP2 IPAM 442 for PSP2. Similarly, if NHN 410(1) supports PSP1 420, PSP2 422 and PSP3 424, then NHN 410(1) also includes PSP1 IPAM 440 for PSP1 420, a PSP2 IPAM 442 for PSP2 422 and a PSP3 IPAM 444 for PSP3 424.

In a given NHN, each PSP is assigned a (minimum of one) Prefix. For example,

PSP1 is assigned the Prefix 2001:1111::
PSP2 is assigned the Prefix 2001:2222::
PSP3 is assigned the Prefix 2001:3333::

As described above in connection with FIGS. 1 and 2, the NH-MME or PSP IPAM synchronizes the Policy Manager of the PSP in order to obtain an indication of the supported policies and the associated Policy_ID. For example, Policy_ID 100--{sequence of services or policies or slices}

Policy_ID 101--{sequence of services or policies or slices}

The UPF of each PSP simply maintains the policy states, like that shown in FIG. 3. When a packet with Policy_ID 100 is received, apply service function 1 (SF1), SF2 etc. (or steer the traffic over the relevant service function chain).

As explained above, each UE is assigned an IPv6 address that is a concatenation of several elements. In a variation to the 3-element scheme described above, the concept of a NHN (or NH) ID is added, where the NHN-ID (or NH-ID) identifies the NHN through which traffic transits between a UE and a PSP. This allows a PSP to construct and execute policies on an NHN specific basis so that traffic may be treated differently depending on which NHN the traffic transits. The 4-element IP address scheme is:

Prefix:Policy_ID:NH-ID_UE_ID where Prefix identifies the PSP and is also used by the PSP-UPF to detect that this is a special address (Policy_ID address that embeds the Policy_ID), Policy_ID identifies the policy to be applied, NHN-ID or (NH-ID) is an identifier of an NHN site through which traffic transits to reach a PSP, and UE_ID is a unique identifier assigned to a UE.

Thus, in one embodiment, an Interface ID (last 64 bits) can be deemed as a combination of the NH-ID and the unique UE_ID, and the Policy_ID. In another embodiment, the first 64 bits can have all that information.

When any UE-originated traffic or UE-destined traffic is received by the PSP-UPF with Policy_ID encoded in the IP address (source or destination respectively), the address semantic is used by PSP-UPF to not only identify one or more policies, but also enforce it on the UE traffic, in either direction (uplink traffic or downlink traffic).

Moreover, as described above, depending on the type of policies to be applied or number of policies to be applied, one or more addresses may be assigned to a UE. IPv6 supports multiple address assignment to a given device. This special semantic based addressing allows services to be applied to traffic in each PSP or offloaded to the NHN without the need to maintain a per-UE-based state entry.

Figure 5:
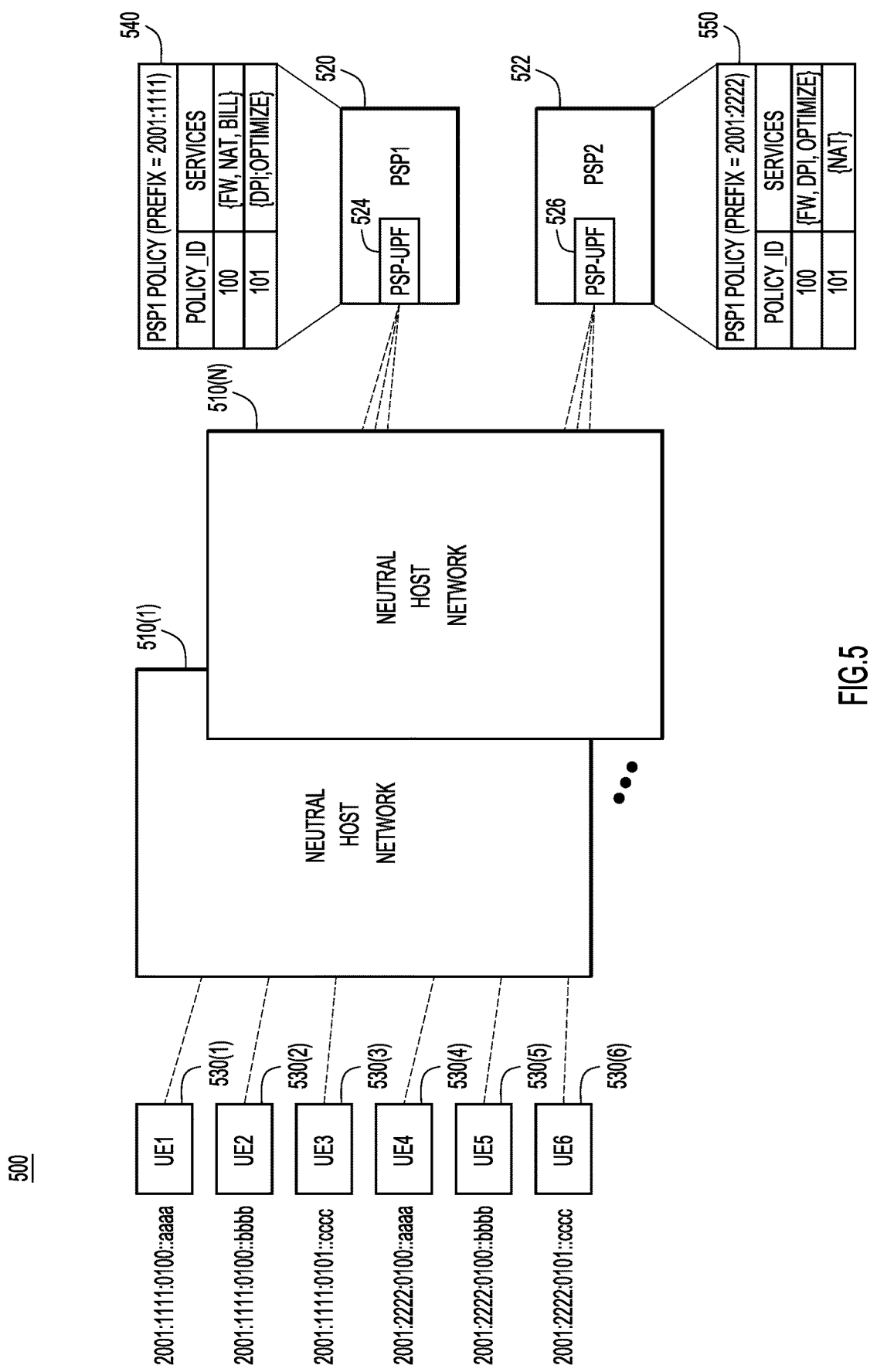
FIG. 5 is a diagram of an example system having multiple neutral host networks and in which address assignment is performed by an appropriate neutral host network and policies are applied by an appropriate participating service provider among multiple participating service providers, according to an example embodiment.
Figure 6:
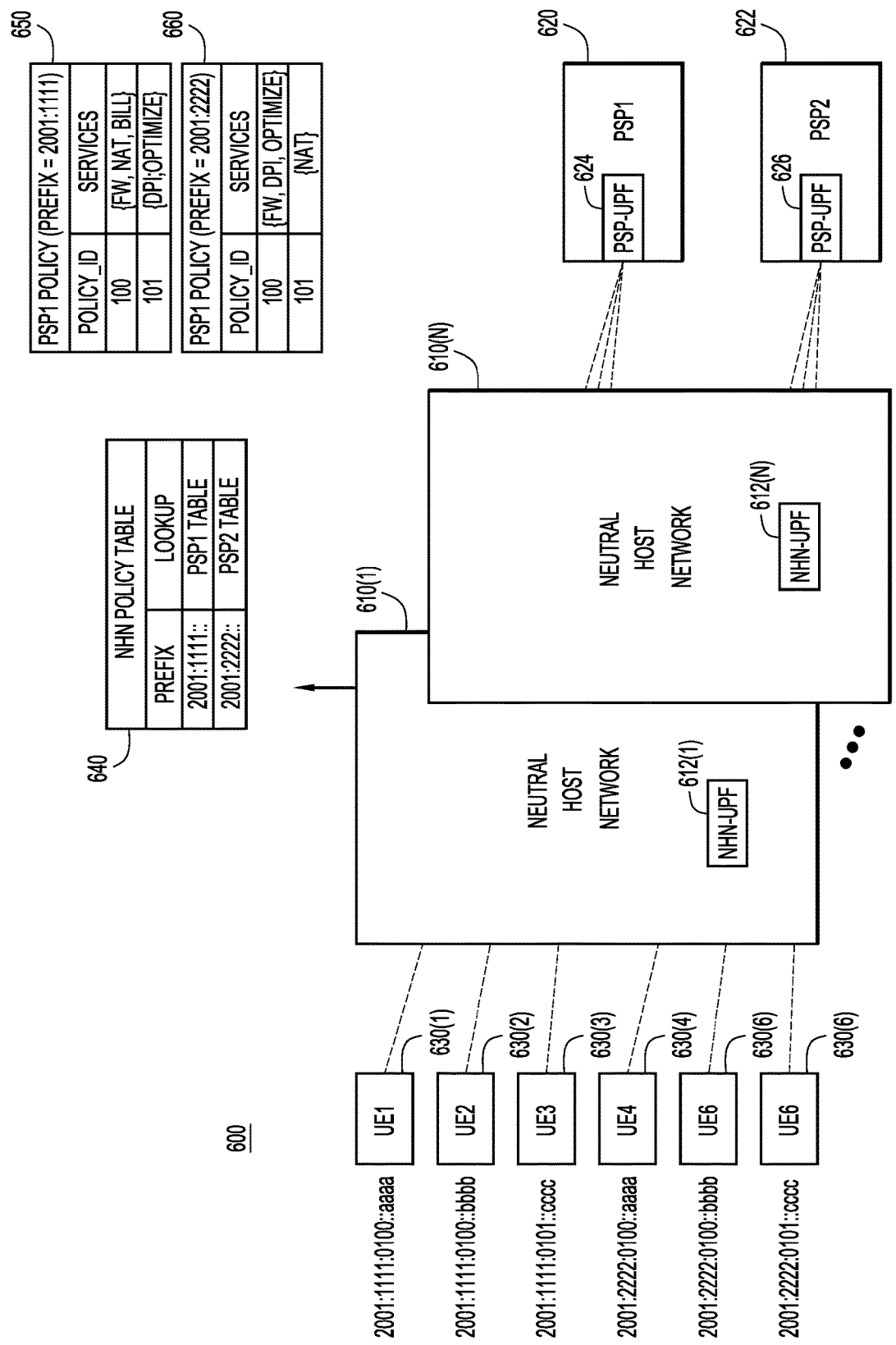
FIG. 6 is a diagram of an example system having multiple neutral host networks and in which the address assignment and the policy application are performed by the appropriate neutral host network, according to an example embodiment.

Two further example embodiments of the presented techniques are now described with reference to FIGS. 5 and 6. FIG. 5 shows an embodiment having multiple NHNs, where the address assignment is performed by an NHN and the policies are applied by a PSP. FIG. 6 shows an embodiment having multiple NHNs and in which the address assignment and the policy application are performed by the NHN. The embodiment depicted in FIG. 6 is also called NHN Service Offload.

Referring now to FIG. 5, a system 500 is shown that includes a plurality of NHNs 510(1)-510(N) and two PSPs, PSP1 520 and PSP2 522. Any of the NHNs 510(1)-510(N) may serve as the transit network for either of the PSPs 520 and 522. In this option, the NHN-MME in each NHN synchronizes with each PSP and is made aware of the Prefix for each PSP (from which the address is to be applied) and the Policy_ID for each of the policies supported by each PSP. PSP1 520 includes a PSP-UPF 524 and PSP2 522 includes a PSP-UPF 526.

FIG. 5 further shows 6 UEs, UE1, UE2, UE3, UE4, UE5, and UE6, at 530(1)-530(6). UE1, UE2 and UE3 belong to PSP1 520 and UE4, UE5 and UE6 belong to PSP2 522. Based on the policy requirement, UE1 and UE2 are assigned Policy_ID 100 while UE3 is assigned Policy_ID 101. The Prefix for PSP1 is "2001:1111::" and the Prefix for PSP2 is "2001:2222::".

As shown at 540 in FIG. 5, PSP1 520 has two policies configured on it, Policy_ID 100 and Policy_ID 101. Similarly, as shown at 550, PSP2 522 has two policies configured on it, also with Policy_ID 100 and Policy_ID 101. The same Policy_ID can be associated with different policy actions/services in different PSPs, as depicted in FIG. 5. For example, Policy_ID 100 in PSP1 has services {FW, Network Address Translation (NAT) and Billing}, whereas Policy_ID 100 in PSP2 has services {FW, DPI and Optimize}. Similarly, Policy_ID 101 in PSP1 has services {DPI and Optimize}, whereas Policy_ID 101 in PSP2 has service {NAT}.

As described above, the IP address is a concatenation of PSP_Prefix+policy_ID+NHN-ID_UE_ID. When the PSP-UPF 524 of PSP1 receives a packet from UE1, it uses the Policy_ID 100 to steer the traffic over FW, NAT and then a Billing function. When PSP-UPF 526 of PSP2 522 receives a packet from UE4, it uses the Policy_ID 100 to steer the traffic over FW, DPI and then to Optimize function. Regardless of the number of UEs, the PSP-UPFs 524 and 526 maintain only the state entry for each policy.

Reference is now made to FIG. 6. FIG. 6 shows a system 600 that is similar in some respects to system 500 of FIG. 5. System 600 includes a plurality of NHNs 610(1)-610(N), and two PSPs, PSP1 620 and PSP2 622. NHN 610(1) includes NHN-UPF 612(1) and NHN 610(N) includes NHN-UPF 612(N). PSP1 620 includes PSP-UPF 624 and PSP2 622 includes PSP-UPF 626. There are UEs UE1, UE2, UE3, UE4, UE5 and UE6 at reference numerals 630(1)-630(6). Furthermore, NHN(1) uses mapping information represented by NHN Policy Table 640, as described below. Each of the NHNs of NHNs 610(1)-610(N) have a similar NHN Policy Table. The NHN Policy Table maps a Prefix to a PSP Policy Table, as shown in FIG. 6. Furthermore, PSP1 620 has stored policy mapping information as shown at 650 and PSP2 622 has stored policy mapping information as shown at 660.

The system 600 operates somewhat similar to that of system 500 of FIG. 5, except that the services are offloaded to the NHN-UPF of the transit NHN. This can be a compute resource offering of the NHN, but where the functions are controlled by the PSPs. In other words, the UPF functions, while physically residing and running on one or more compute resources inside the NHN, are configured and managed by a management entity in the PSP.

When an NHN-UPF, such as NHN-UPF 612(1), receives a packet associated with traffic for any UE, it uses the Prefix of the IP address of the packet to identify, using information stored in NHN Policy Table 640, the particular PSP to which the UE belongs. The NHN-UPF 612(1) then fetches the Policy_ID from the IP address of the packet to identify the policy to be applied, based on the Policy_ID lookup in the relevant PSP Policy Table 650 or 660. The NHN-UPF 612(1) then steers traffic to the relevant service function(s) implemented by the NHN-UPF 612(1), but configured and maintained by the relevant PSP.

As an example, UE1 sends traffic via NHN 610(1). The IP address for UE1 is 2001:1111:0100:aaaa, which has already been assigned using the techniques described above in connection with FIGS. 1 and 2. Thus, the Prefix portion of the IP address for UE1 is "2001:1111" which is associated with PSP1 620. The NHN-UPF 612(1) receives the packet from UE1, and based on the Prefix "2001:1111" and the NHN Policy Table 640, the NHN-UPF 612(1) determines that UE1 belongs to PSP1 and thus the packet from UE1 should be handled according to the policies of the PSP1 Policy Table 650. The NHN-UPF 612(1) fetches the Policy_ID from the IP address, which is "100" in this example, and looks up the services to be applied to the packet based on the PSP1 Policy Table 650. In this example, Policy_ID 100 indicates that the services {FW, NAT and Billing} should be applied to the packet. The NHN-UPF 612(1) then steers the packet to those service functions, implemented by the NHN-UPF 612(1).

As still a further variation for the embodiments depicted in FIGS. 5 and 6, the NHN-ID, included as part of the IP address of the UE, may also be used to determine the services to be applied to traffic for a UE. Thus, the PSP Policy Table that takes into account the particular NHN (among a plurality of NHNs) that the UE traffic transits may take the form of Table 1 below.

TABLE 1

| Policy_ID | NHN_ID | Services |
|---|---|---|
| 100 | 001 | {FW, NAT, DPI} |
| 100 | 002 | {DPI, Optimize} |
| 101 | 001 | {FW, DPI} |
| 101 | 003 | {NAT} |

As shown in Table 1 above, the services to be applied to UE traffic having the same Policy_ID in its IP address, may be different depending on the NHN that the UE traffic transited. For example, UE traffic with Policy_ID 100 and NHN ID 001 (indicating that the UE traffic transited NHN 1) is run through FW, NAT and then DPI services, whereas UE traffic with Policy_ID 100 and NHN ID 002 (indicating that the traffic transited NHN 2) is run through DPI then Optimize services. Similarly, UE traffic with Policy_ID 101 and NHN ID 001 (indicating that the UE traffic transited NHN 1) is run through FW DPI services, whereas UE traffic with Policy_ID 101 and NHN ID 003 (indicating that the traffic transited NHN 3) is run through only NAT services.

As explained above, policy enforcement is made per flow per UE without mandating any per-UE state on any entity in the system, such as an ePDG, PSP-UPF etc. A special semantic in the IP address (e.g., IPv6 address) is created for encoding the policy to be applied to the traffic, either in the NHN or the applicable PSP. These techniques are applicable regardless of the particular access technology employed by the NHN, such as Wi-Fi® wireless local area network (WLAN) technology, cellular wireless wide area network (WWAN) technology, or any other suitable access network technology, now known or hereinafter developed. Furthermore, these techniques work even when a UE is assigned a single IPv6 prefix or multiple IPv6 prefixes. The Policy_ID could be implemented via a bitmask to allow for more than one policy per slice per UE. For example, the Policy_ID is a 4-bit field in the address (the number of policies that can be included depends on the size of this field). Each policy may be assigned with a unique bit-id within this range. Each bit would represent a policy as per a mapping that is known/provisioned a priori. If 4 out of 8 bits are set, then 4 policies might be enforced on the packet. For example, Policy1 is assigned with 0001, Policy2 is assigned with 0010, Policy3 is assigned with 0100 and Policy4 is assigned with 1000. If the traffic from UE should be applied with Policy1 and Policy4, the bitmask will be set to 1001. If the traffic should be applied with Policy1 and Policy3, the bitmask is set to 0101, and so on.

The NHN ID_UE_ID and Policy_ID are exchanged between an NHN and PSP for constructing the semantic IPv6 address, while allowing IP address assignment to be done by the NHN or PS. These techniques provide flexibility of policy enforcement in the PSP, whether the deployment model involves an IPAM function being offloaded to one or more NHN operators, or not. The UPF may identify all flows related to a UE even if that UE is part of multiple slices and multiple policies, based on the UE_ID.

Figure 7:
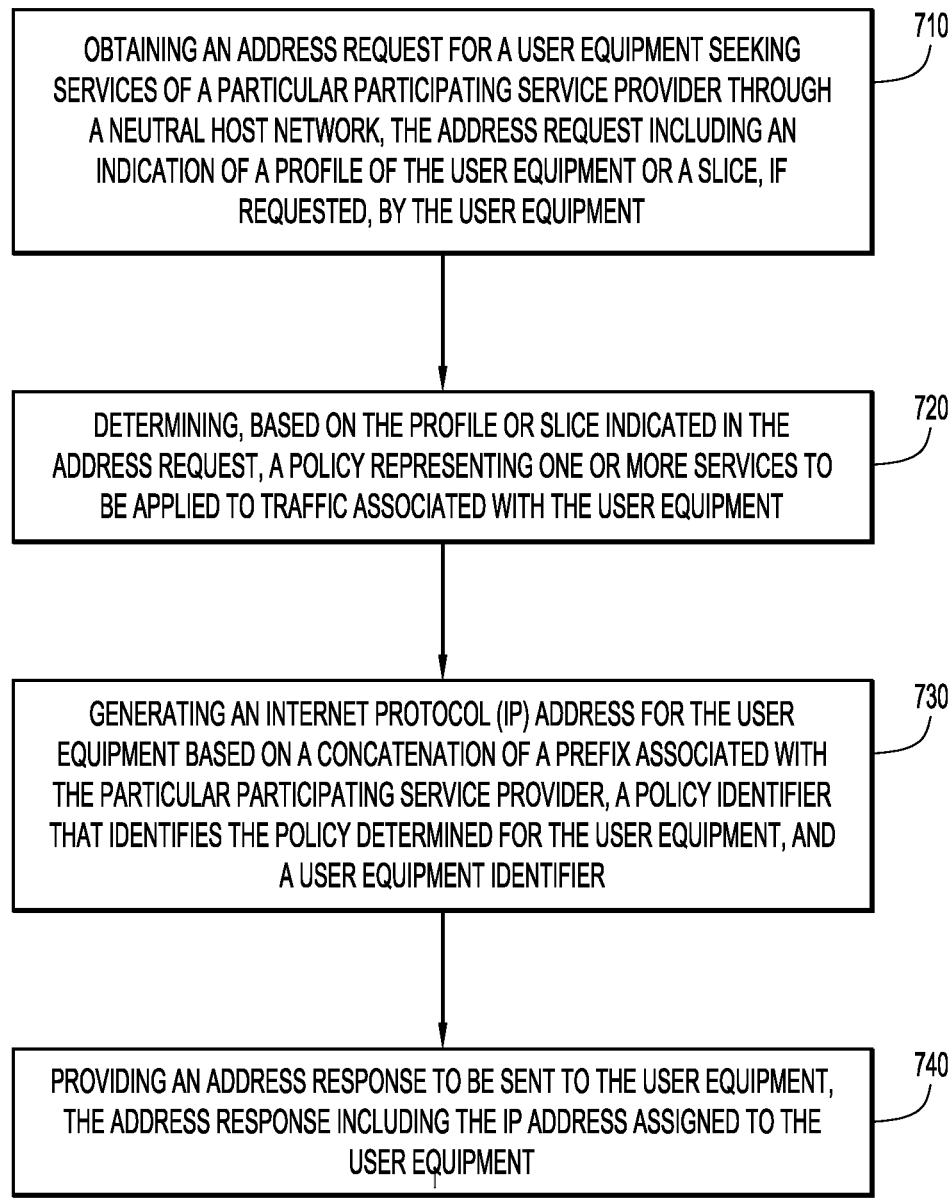
FIG. 7 is a flow chart depicting a method for address assignment to user equipment, according to an example embodiment.

Reference is now made to FIG. 7, which illustrates a flow chart for a method 700 of generating and an assignment an IP address for a UE, according to an example embodiment. The method 700 may be performed by an entity in an NHN, such as an IPAM, or by an entity in a PSP. At 710, the method 700 includes obtaining an address request for a user equipment seeking services of a particular participating service provider through a neutral host network. The address request includes an indication of a profile of the user equipment or a slice, if requested, by the user equipment. At 720, the method 700 includes determining, based on the profile or slice indicated in the address request, a policy representing one or more services to be applied to traffic associated with the user equipment. At 730, the method includes generating an Internet Protocol (IP) address for the user equipment based on a concatenation of a prefix associated with the particular participating service provider, a policy identifier that identifies the policy determined for the user equipment, and a user equipment identifier. At 740, the method includes providing an address response to be sent to the user equipment, the address response including the IP address assigned to the user equipment.

The operation 730 of generating the IP address may be performed by an address management entity in the neutral host network. The address management entity may be dedicated to the particular participating service provider.

The method 700 may further include, at the address management entity: obtaining, from a policy manager entity associated with the particular participating service provider, the prefix associated with the particular participating service provider, and mapping information that maps profiles and slices to policy identifiers, each policy identifier associated with a corresponding policy representing one or more services to be applied to user equipment traffic; and storing the mapping information; wherein determining the policy for the user equipment includes performing a lookup in the mapping information.

In one form, the neutral host network advertises support of a plurality participating service providers, including the particular participating service provider, and includes a plurality of address management entities, each for a corresponding participating service provider of the plurality of participating service providers. In this case, the operation 710 of obtaining the address request comprises obtaining the address request at a particular address management entity associated with the particular participating service provider.

In one form, the neutral host network is a particular neutral host network of a plurality of neutral host networks, and the operation 730 of generating the IP address for the user equipment further includes including in the IP address a neutral host identifier that identifies the particular neutral host network. In one example, the user equipment identifier is locally unique to the particular neutral host network.

Reference is now made to FIG. 8. FIG. 8 illustrates a flow chart of a method 800 for enforcing/applying a policy to UE traffic, according to an example embodiment. The method 800 may be performed by a UPF residing in a PSP or by a UPF residing in an NHN. At 810, the method includes obtaining a packet originating from, or sent to, a user equipment via a neutral host network and destined to, or originating from, a particular participating service provider, the packet having an Internet Protocol (IP) address assigned to the user equipment. The IP address is based on a concatenation of a prefix associated with the particular participating service provider, a policy identifier that identifies a policy determined for the user equipment, and a user equipment identifier. At 820, the method includes obtaining the policy identifier from the IP address of the packet.

At 830, the method 800 includes determining, based on the policy identifier, a particular policy among a plurality of policies, each policy representing one or more services to be applied to the packet from the user equipment. At 840, the method 800 includes directing the packet to one or more services according to the particular policy.

The method 800 may further include determining, based on presence of the prefix in the IP address, that the IP address is a type of IP address that includes the policy identifier to indicate which one or more services are to be applied to the packet.

Further, the method 800 may further include encapsulating the packet with a header that results in directing the packet over a network slice or one or more service functions in a service chain.

Moreover, the method 800 may further include storing for each of the plurality of policies, a corresponding policy identifier and a semantic that indicates one or more services to be applied for a corresponding policy.

In one form, the operations 810 of obtaining the packet, 820 of obtaining the policy identifier, 830 of determining the particular policy and 840 of directing the packet are performed by a user plane function residing at the particular participating service provider or by a user plane function residing in the neutral host network.

In one form, the neutral host network advertises support of a plurality participating service providers, including the particular participating service provider, and wherein the prefix indicates with which of the plurality participating service providers the packet associated. The method 800 further includes: storing mapping information indicating assignment of prefixes to respective ones of the plurality of participating service providers; and determining, based on the prefix included in the IP address of the packet and the mapping information, which of the plurality of participating service providers the packet is associated for servicing by an associated user plane function.

The same policy identifier may be associated with different policies in different participating service providers.

As described above, the neutral host network may be a particular neutral host network of a plurality of neutral host networks, and wherein the IP address further includes a neutral host identifier that identifies the particular neutral host network. In this configuration, the method 800 may further include determining, based on the policy identifier, the particular policy is further based on the neutral host identifier in the IP address of the packet.

The techniques presented herein have several advantages. These techniques achieve better scalability than existing solutions. There is no need to maintain per-UE policy state on any entity in the network. UEs need only support IPv6 addresses. These techniques further achieve better visibility because the data plane has all the information all the time in the mobility network.

As mentioned above, policy state is separated/decoupled from the UE state. The policy awareness is in the IP address. The last 64-bits of the IP address reveals the policy. The UE is completely unaware that the policy information is embedded in the IP address. Moreover, the NHN is not involved in policy identifier assignment and the PSP does not need to share any underlying reasoning with the NHN concerning policy assignment or policy identifier assignment. The PSP and NHN are distinct entities. This works well when there are multiple NHNs. There may NHNs and a relatively smaller number of PSPs. The PSPs are really a "customer" of the NHNs and use the NHNs as a transit network. These techniques allow a PSP operator to construct single definition of policies, regardless of the number of NHNs.

Figure 9:
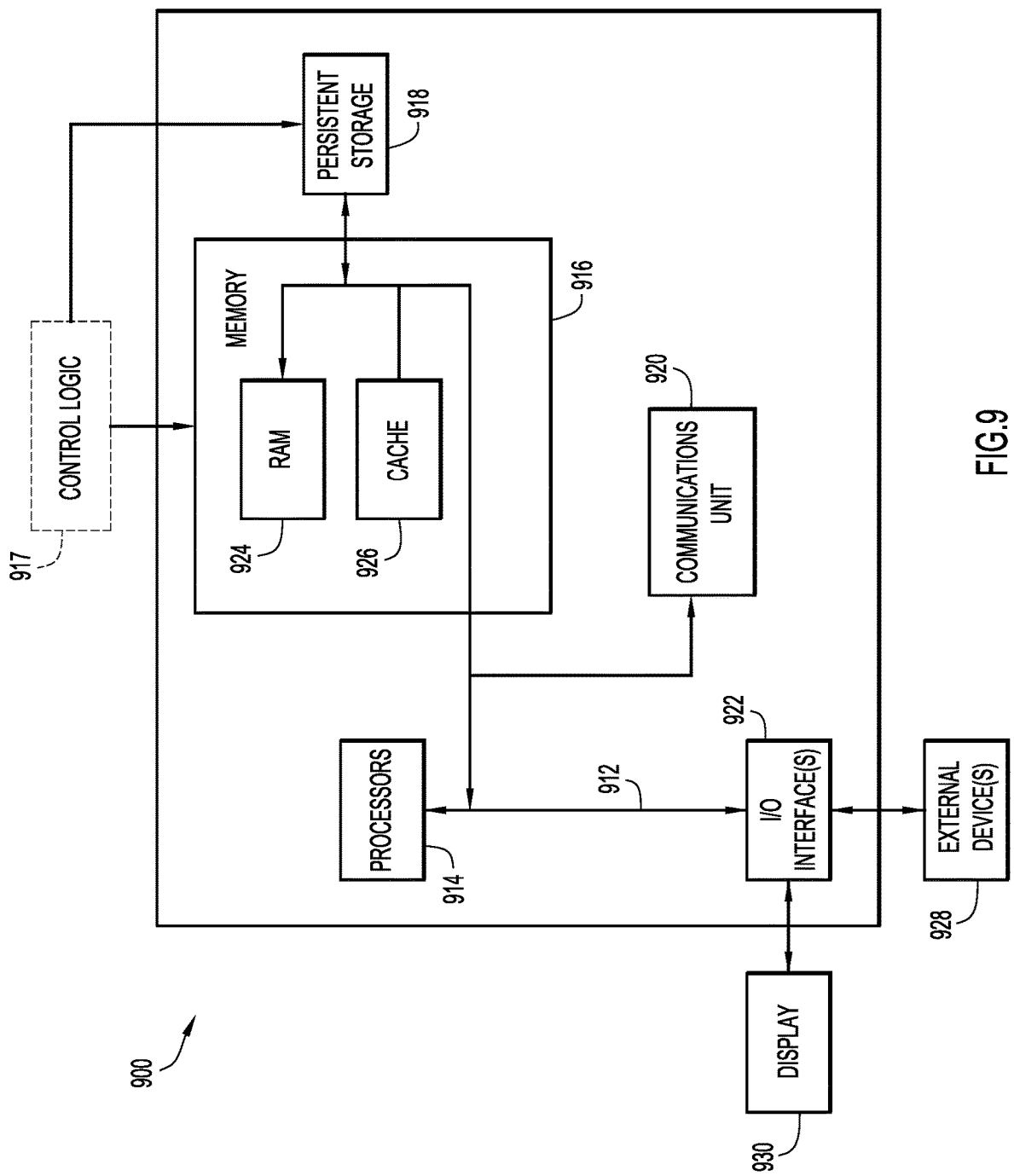
FIG. 9 is a block diagram of a computing device configured to perform the operations presented herein, according to an example embodiment.

FIG. 9 illustrates a hardware block diagram of a computing device 900 that may perform the functions of an IPAM or any entity that performs the address assignment techniques presented. The diagram of the computing device 900 is also representative of a computing resource that performs the functions of a UPF, ePDG or any entity that performs the policy enforcement/application techniques described herein. It should be appreciated that FIG. 9 provides only an illustration of one embodiment and does not imply any limitations with regard to the environments in which different embodiments may be implemented. Many modifications to the depicted environment may be made.

As depicted, the device 900 includes a bus 912, which provides communications between computer processor(s) 914, memory 916, persistent storage 918, communications unit 920, and input/output (I/O) interface(s) 922. Bus 912 can be implemented with any architecture designed for passing data and/or control information between processors (such as microprocessors, communications and network processors, etc.), system memory, peripheral devices, and any other hardware components within a system. For example, bus 912 can be implemented with one or more buses.

Memory 916 and persistent storage 918 are computer readable storage media. In the depicted embodiment, memory 916 includes random access memory (RAM) 924 and cache memory 926. In general, memory 916 can include any suitable volatile or non-volatile computer readable storage media. Instructions for the Control Logic 917 may be stored or encoded in memory 916 or persistent 918 for execution by processor(s) 914. In one embodiment, when the processor(s) 914 execute the instructions for the Control Logic 917, the computing device 900 is caused to perform the operations described above for IP address generation and assignment for a UE. In another embodiment, when the processor(s) 914 execute the instructions for the Control Logic 91, the computing device 900 is caused to perform the operations described above policy enforcement/application to UE traffic.

One or more programs may be stored in persistent storage 918 for execution by one or more of the respective computer processors 914 via one or more memories of memory 916. The persistent storage 918 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 918 may also be removable. For example, a removable hard drive may be used for persistent storage 918. Other examples include optical and magnetic disks, thumb drives, and smart cards that are inserted into a drive for transfer onto another computer readable storage medium that is also part of persistent storage 918.

Communications unit 920, in these examples, provides for communications with other data processing systems or devices. In these examples, communications unit 920 includes one or more network interface cards. Communications unit 920 may provide communications through the use of either or both physical and wireless communications links.

I/O interface(s) 922 allows for input and output of data with other devices that may be connected to computer device 900. For example, I/O interface 922 may provide a connection to external devices 928 such as a keyboard, keypad, a touch screen, and/or some other suitable input device. External devices 928 can also include portable computer readable storage media such as database systems, thumb drives, portable optical or magnetic disks, and memory cards.

Software and data used to practice embodiments can be stored on such portable computer readable storage media and can be loaded onto persistent storage 918 via I/O interface(s) 922. I/O interface(s) 922 may also connect to a display 930. Display 930 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, the techniques presented herein eliminate the need to maintain per-UE or per-flow policy states on a UPF or ePDG. A new semantic of IP address assignment is provided by embedding the policies in the IP address, allowing the PSP operator to implement policy enforcement on per-flow or per-UE in a nearly stateless manner. By assigning different policies based on Policy_ID and embedding the same as part of the address, the PSP-UPF or ePDG need only maintain the states for the policies and not for the UEs. If there are 100 different types of policies and around 100,000 UEs, then the number of policies to be maintained is just 100.

Moreover, these techniques achieve scalable flexibility with respect to policy enforcement in a PSP, whether or not the deployment model involves the IPAM being offloaded to the NHN (i.e. UE's IP prefix changes or not) and there are multiple NHN operators. Since the policy-ID is encoded in the last 64-bits of the IP address, the PSP can continue to have a common classification and policy applicability.

In one embodiment, a method is provided comprising: obtaining an address request for a user equipment seeking services of a particular participating service provider through a neutral host network, the address request including an indication of a profile of the user equipment or a slice, if requested, by the user equipment; determining, based on the profile or slice indicated in the address request, a policy representing one or more services to be applied to traffic associated with the user equipment; generating an Internet Protocol (IP) address for the user equipment based on a concatenation of a prefix associated with the particular participating service provider, a policy identifier that identifies the policy determined for the user equipment, and a user equipment identifier; and providing an address response to be sent to the user equipment, the address response including the IP address assigned to the user equipment.

In another form, an apparatus is provided comprising: a communication interface configured to enable network communications; and at least one processor coupled to the communication interface, wherein the processor is configured to: obtain an address request for a user equipment seeking services of a particular participating service provider through a neutral host network, the address request including an indication of a profile of the user equipment or a slice, if requested, by the user equipment; determine, based on the profile or slice indicated in the address request, a policy representing one or more services to be applied to traffic associated with the user equipment; generate an Internet Protocol (IP) address for the user equipment based on a concatenation of a prefix associated with the particular participating service provider, a policy identifier that identifies the policy determined for the user equipment, and a user equipment identifier; and provide an address response to be sent to the user equipment, the address response including the IP address assigned to the user equipment.

In still another form, one or more non-transitory computer readable storage media are provided, encoded with instructions that, when executed by a processor, cause the processor to perform operations including: obtaining an address request for a user equipment seeking services of a particular participating service provider through a neutral host network, the address request including an indication of a profile of the user equipment or a slice, if requested, by the user equipment; determining, based on the profile or slice indicated in the address request, a policy representing one or more services to be applied to traffic associated with the user equipment; generating an Internet Protocol (IP) address for the user equipment based on a concatenation of a prefix associated with the particular participating service provider, a policy identifier that identifies the policy determined for the user equipment, and a user equipment identifier; and providing an address response to be sent to the user equipment, the address response including the IP address assigned to the user equipment.

In another embodiment, a method is provided comprising: obtaining a packet originating from, or sent to, a user equipment via a neutral host network and destined to, or originating from, a particular participating service provider, the packet having an Internet Protocol (IP) address assigned to the user equipment, the IP address being based on a concatenation of a prefix associated with the particular participating service provider, a policy identifier that identifies a policy determined for the user equipment, and a user equipment identifier; obtaining the policy identifier from the IP address of the packet; determining, based on the policy identifier, a particular policy among a plurality of policies, each policy representing one or more services to be applied to the packet from the user equipment; and directing the packet to one or more services according to the particular policy.

In another form, an apparatus is provided comprising: a communication interface configured to enable network communications; and at least one processor coupled to the communication interface, wherein the processor is configured to: obtain a packet originating from, or sent to, a user equipment via a neutral host network and destined to, or originating from, a particular participating service provider, the packet having an Internet Protocol (IP) address assigned to the user equipment, the IP address being based on a concatenation of a prefix associated with the particular participating service provider, a policy identifier that identifies a policy determined for the user equipment, and a user equipment identifier; obtain the policy identifier from the IP address of the packet; determine, based on the policy identifier, a particular policy among a plurality of policies, each policy representing one or more services to be applied to the packet from the user equipment; and direct the packet to one or more services according to the particular policy.

In still another form, one or more non-transitory computer readable storage media are provided, encoded with instructions that, when executed by a processor, cause the processor to perform operations including: obtaining a packet originating from, or sent to, a user equipment via a neutral host network and destined to, or originating from, a particular participating service provider, the packet having an Internet Protocol (IP) address assigned to the user equipment, the IP address being based on a concatenation of a prefix associated with the particular participating service provider, a policy identifier that identifies a policy determined for the user equipment, and a user equipment identifier; obtaining the policy identifier from the IP address of the packet; determining, based on the policy identifier, a particular policy among a plurality of policies, each policy representing one or more services to be applied to the packet from the user equipment; and directing the packet to one or more services according to the particular policy.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining an address request for a user equipment seeking services of a particular participating service provider through a neutral host network, the address request including an indication of a profile of the user equipment or a slice, if requested, by the user equipment;
    determining, based on the profile or slice indicated in the address request, a policy representing one or more services to be applied to traffic associated with the user equipment;
    generating an Internet Protocol (IP) address for the user equipment based on a concatenation of a prefix associated with the particular participating service provider, a policy identifier that identifies the policy determined for the user equipment, and a user equipment identifier; and
    providing an address response to be sent to the user equipment, the address response including the IP address assigned to the user equipment.

2. The method of claim 1, wherein the generating is performed by an address management entity in the neutral host network.

3. The method of claim 2, wherein the address management entity is dedicated to the particular participating service provider.

4. The method of claim 3, further comprising the address management entity:
    obtaining, from a policy manager entity associated with the particular participating service provider, the prefix associated with the particular participating service provider, and mapping information that maps profiles and slices to policy identifiers, each policy identifier associated with a corresponding policy representing one or more services to be applied to user equipment traffic; and
    storing the mapping information;
    wherein determining the policy for the user equipment includes performing a lookup in the mapping information.

5. The method of claim 4, wherein the neutral host network advertises support of a plurality participating service providers, including the particular participating service provider, and includes a plurality of address management entities, each for a corresponding participating service provider of the plurality of participating service providers, and wherein obtaining the address request comprises obtaining the address request at a particular address management entity associated with the particular participating service provider.

6. The method of claim 1, wherein the neutral host network is a particular neutral host network of a plurality of neutral host networks, and wherein generating the IP address for the user equipment further includes including in the IP address a neutral host identifier that identifies the particular neutral host network.

7. The method of claim 6, wherein the user equipment identifier is locally unique to the particular neutral host network.

8. A method comprising:
   obtaining a packet originating from, or sent to, a user equipment via a neutral host network and destined to, or originating from, a particular participating service provider, the packet having an Internet Protocol (IP) address assigned to the user equipment, the IP address being based on a concatenation of a prefix associated with the particular participating service provider, a policy identifier that identifies a policy determined for the user equipment, and a user equipment identifier;
   obtaining the policy identifier from the IP address of the packet;
   determining, based on the policy identifier, a particular policy among a plurality of policies, each policy representing one or more services to be applied to the packet from the user equipment; and
   directing the packet to one or more services according to the particular policy.

9. The method of claim 8, further comprising determining, based on presence of the prefix in the IP address, that the IP address is a type of IP address that includes the policy identifier to indicate which one or more services are to be applied to the packet.

10. The method of claim 8, further comprising encapsulating the packet with a header that results in directing the packet over a network slice or one or more service functions in a service chain.

11. The method of claim 8, further comprising storing for each of the plurality of policies, a corresponding policy identifier and a semantic that indicates one or more services to be applied for a corresponding policy.

12. The method of claim 8, wherein the obtaining the packet, obtaining the policy identifier, determining the particular policy and directing the packet are performed by a user plane function residing at the particular participating service provider or by a user plane function residing in the neutral host network.

13. The method of claim 8, wherein the neutral host network advertises support of a plurality participating service providers, including the particular participating service provider, and wherein the prefix indicates with which of the plurality participating service providers the packet associated, further comprising:
   storing mapping information indicating assignment of prefixes to respective ones of the plurality of participating service providers; and
   determining, based on the prefix included in the IP address of the packet and the mapping information, which of the plurality of participating service providers the packet is associated for servicing by an associated user plane function.

14. The method of claim 13, wherein a same policy identifier is associated with different policies in different participating service providers.

15. The method of claim 8, wherein the neutral host network is a particular neutral host network of a plurality of neutral host networks, and wherein the IP address further includes a neutral host identifier that identifies the particular neutral host network.

16. The method of claim 15, wherein determining, based on the policy identifier, the particular policy is further based on the neutral host identifier in the IP address of the packet.

17. An apparatus comprising:
   a communication interface configured to enable network communications; and
   at least one processor coupled to the communication interface, wherein the processor is configured to:
      obtain an address request for a user equipment seeking services of a particular participating service provider through a neutral host network, the address request including an indication of a profile of the user equipment or a slice, if requested, by the user equipment;
      determine, based on the profile or slice indicated in the address request, a policy representing one or more services to be applied to traffic associated with the user equipment;
      generate an Internet Protocol (IP) address for the user equipment based on a concatenation of a prefix associated with the particular participating service provider, a policy identifier that identifies the policy determined for the user equipment, and a user equipment identifier; and
      provide an address response to be sent to the user equipment, the address response including the IP address assigned to the user equipment.

18. The apparatus of claim 17, wherein the processor is configured to:
   obtain, from a policy manager entity associated with a particular participating service provider, the prefix associated with the particular participating service provider, and mapping information that maps profiles and slices to policy identifiers, each policy identifier associated with a corresponding policy representing one or more services to be applied to user equipment traffic; and
   store the mapping information;
   wherein the policy for the user equipment includes is determined by performing a lookup in the mapping information.

19. The apparatus of claim 18, wherein the neutral host network advertises support of a plurality of participating service providers, including the particular participating service provider, and includes a plurality of address management entities, each for a corresponding participating service provider of the plurality of participating service providers, and wherein the processor is configured to obtain the address request by obtaining the address request at a particular address management entity associated with the particular participating service provider.

20. The apparatus of claim 17, wherein the neutral host network is a particular neutral host network of a plurality of neutral host networks, and wherein the processor is configured to generate the IP address for the user equipment by including in the IP address a neutral host identifier that identifies the particular neutral host network.

* * * * *